UNITED STATES PATENT OFFICE.

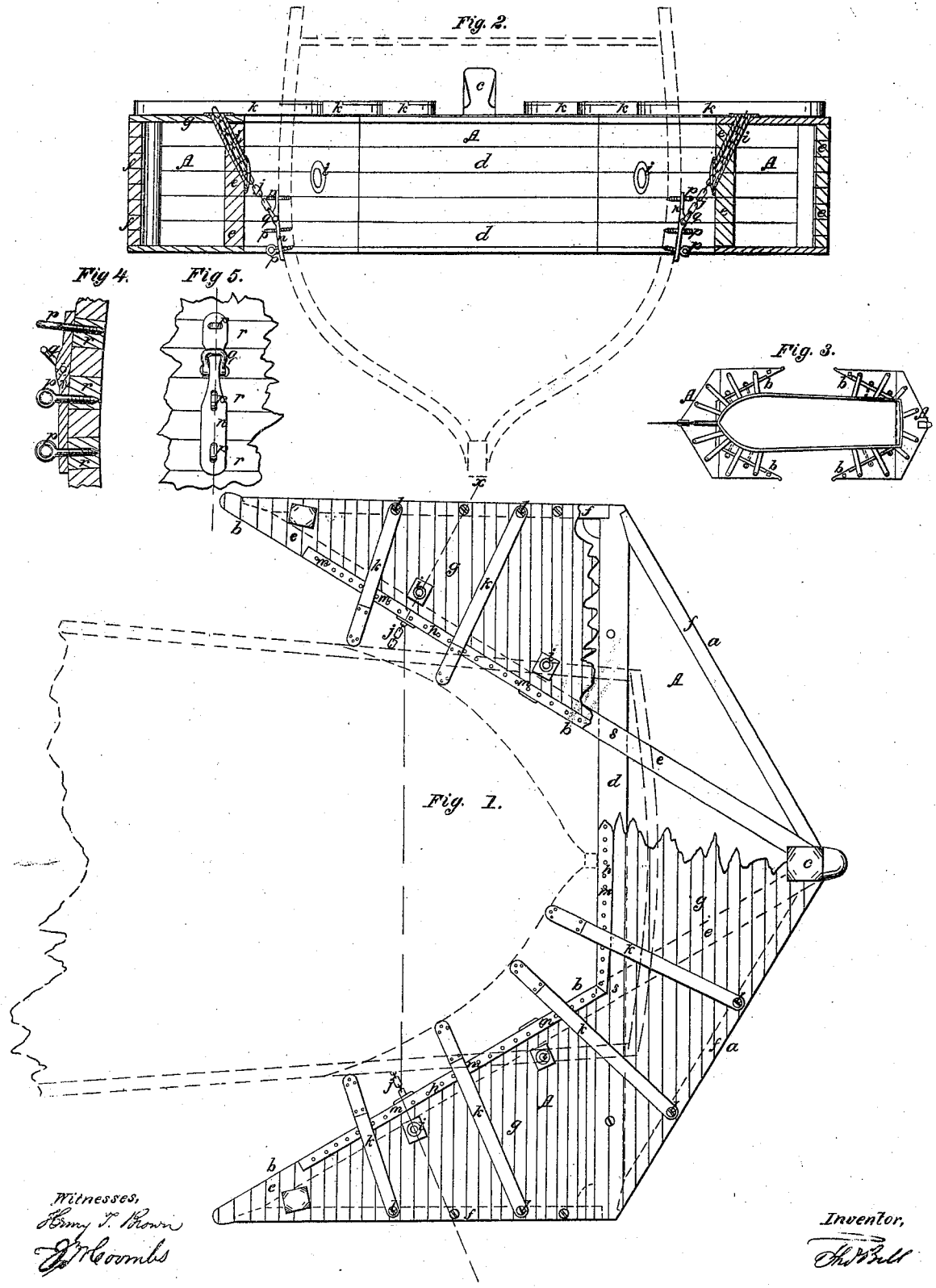

THOMAS BELL, OF BELLPORT, NEW YORK.

IMPROVED MODE OF RAISING SUNKEN VESSELS.

Specification forming part of Letters Patent No. 46,333, dated February 14, 1865.

*To all whom it may concern:*

Be it known that I, THOMAS BELL, of Bellport, in the county of Suffolk and State of New York, have invented certain new and useful Improvements in Apparatus for Raising Sunken Vessels; and I do hereby declare that the following is a full, clear, and exact description of the same, reference being had to the accompanying drawings, forming part of this specification, in which—

Figure 1 is a plan of my invention, illustrating its application to one end of a vessel. Fig. 2 is a transverse vertical section of the same in the line $x$ $x$ of Fig. 1. Fig. 3 is a diagram illustrating the application of my invention to both ends of a vessel. Fig. 4 is a vertical section, on a larger scale than Figs. 1 and 2, of one of the plates by which the lifting-chains are attached to the vessel to be raised; Fig. 5 is a face view corresponding with Fig. 1.

Similar letters of reference indicate corresponding parts in the several figures.

This invention consists in a novel form and construction of the floats employed for raising vessels, whereby they are better enabled to be kept in place; also, in a novel system of iron pipes passing through the floats for the reception of the lifting-chains, whereby I prevent the slipping of the said chains which occurs when they pass over the edges of the floats; also, in a novel system of rigid braces for keeping the vessel upright in the floats when partly raised or when a portion of it is above the surface of the water; and, further, in a novel system of plates for attaching the chains to the vessel.

To enable others skilled in the art to make and use my invention, I will proceed to describe its construction and operation.

A A are the floats—one for the bow and the other for the stern of the vessel—both of the same form, and the general characteristics of which are, that while portions of them present salient angles, as shown at $a$ $a$ in Fig. 1, to enable them to be easily towed from place to place, the opposite portions are made of a hollow form, as shown at $b$ $b$ in Figs. 1 and 4, to receive the bow or stern and portions of the sides of a vessel, their bottoms being flat and their sides being upright. These may be made of wood or iron; but I generally prefer to make them of wood with a framing composed of an upright stem, $c$, and transverse and diagonal horizontal squared timbers $d$ and $e$ $e$, crossing each other, as shown at $s$ $s$ in Fig. 1, and notched half-way into each other, like the logs of a log cabin. This frame forms the hollow inner sides, $b$ $b$, of the float, and the outer sides are formed of suitable timbers, $f$ $f$, which are notched into the frame and bolted together securely. This bottom is also formed of suitable timbers, the upper part is decked over, and the whole is calked tightly. The deck $g$ is represented partly broken away to expose the framing to view. The inner edges are protected by iron plates, as shown at $h$ $h$ in Fig. 1. The float is divided into three compartments by the timbers $d$ $d$, which permits either side to be filled or pumped out separately, according as may be desirable in lifting a vessel.

$i$ $i$ are the iron pipes, through which the lifting-chains $j$ $j$ work. These pipes are inserted diagonally through the float from the deck to the inner sides and firmly secured, and serve to guide the chains and keep them from slipping out of place.

$k$ $k$ are the rigid braces, composed of stout timbers resting on the top or deck of the float, and pivoted at their outer ends to move horizontally on the deck, by stout pins $l$ $l$, secured in the float, their inner ends extending over the inner edges of the float. Holes $m$ $m$ are provided in the plates $h$ $h$ for the insertion of iron pins on one or both sides of the said braces to keep them in any position in which they are set.

$n$ $n$ are the plates secured to the vessel for the attachment of the lifting-chains. These plates are inserted in upright positions close against the sides of the vessel at distances apart and in positions corresponding with the pipes $i$ $i$ of the floats. They are each secured to the vessel by two or more large wood-screws, $p$ $p$, passing through holes provided for them in the plates and screwing into holes bored in the timbers $r$ $r$ of the vessel, as shown in Fig. 4. The screws $p$ $p$ are made with eyes in their heads for the insertion of levers by which to turn them. The said plates have shackles $q$ $q$ secured to them for the attachment of the lifting-chains. The holes for the screws $p$ $p$ are bored in the vessel and the plates applied by divers.

The vessel is represented in Figs. 1, 2, and 3 in red outline.

The chains $jj$ have screws or other devices connected with them above the deck to apply the necessary power to lift the vessel. The floats are fitted with valves in their bottoms to admit water to their interiors to sink them as low as desirable in the water preparatory to taking a lift, and they are provided on deck with pumps to pump out this water to cause them to rise and lift the vessel.

The operation of the invention is as follows: The two floats are towed to the place where the sunken vessel is located. If the vessel is entirely submerged, the floats are brought to favorable positions, as near as possible to its its head and stern, and filled with water to sink them as low as possible. The plates $nn$ are secured by the divers to the vessel, and the chains are then lowered through the pipes $ii$, and attached to the shackles $qq$ and hauled up to produce a uniform tension on all. The water is then pumped out of the floats, which rise far enough to lift the vessel from the bottom, after which the chains are drawn up to raise the vessel high enough to enable it to be carried into shallower water, where it is removed by towing the floats. When the vessel is again aground, the operation is repeated. When the vessel has been raised partly above water, the floats are applied to its head and stern, as shown in Fig. 3, the chains are tightened, and the braces $kk$ brought to bear against it and secured by inserting pins in the holes $m$, and thus made to steady it and hold it upright, and it is again lifted, as before, and carried into shallower water, which operation is repeated until the vessel has been raised sufficiently to carry her into port or dock for repair. The water may be pumped from the vessel, if necessary, after she has been sufficiently raised. If the vessel has not been sunk entirely below the surface of the water, the braces $kk$ may be applied at the commencement of the process of raising her.

The attachment of the chains to the vessel by means of plates $nn$ is much more easily effected than passing them under her bottom, which is the usual plan, and when so attached do not slip, as when passed under her. The pipes $ii$, by preventing the slipping of the chains on the float, prevent the tearing away of the edges of the float, as well as insure a better attachment of the vessel to the floats.

I do not claim under this application the broad idea of applying floats or "camels" of such form as to partially inclose the bow and stern of the vessel, this being described in my former patent, granted July 21, 1857.

My present invention obviates a difficulty which rendered the floats described in my aforesaid patent inferior and deficient in practical use. This is effected by the use of the transverse or "athwartship" beams $d$, which afford means for direct attachment to the stem and stern posts, and also distribute the weight of the vessel equally over the whole width of the floats, so as to prevent any straining or careening of the latter.

What I claim as my invention, and desire to secure by Letters Patent, is—

1. The camels or floats, constructed with transverse beams $d$ and adapted to receive the stem or stern of a vessel, in the manner herein described.

2. The pipes $ii$, in combination with floats A A, of the construction specified, for the lifting-chains to work through, substantially as and for the purpose herein specified.

3. The braces $kk$, applied in combination with the floats A A, substantially as and for the purpose herein set forth.

4. The attachment of the chains to the vessel to be raised by means of plates $nn$, secured to the vessel by screws, substantially as herein described.

THOS. BELL.

Witnesses:
HENRY T. BROWN,
J. W. COOMBS.